(12) United States Patent
Fujioka et al.

(10) Patent No.: US 7,894,106 B2
(45) Date of Patent: Feb. 22, 2011

(54) IMAGE READING DEVICE AND IMAGE FORMING APPARATUS

(75) Inventors: Tetsuya Fujioka, Kanagawa (JP); Takuji Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1211 days.

(21) Appl. No.: 11/512,201

(22) Filed: Aug. 30, 2006

(65) Prior Publication Data

US 2007/0047025 A1    Mar. 1, 2007

(30) Foreign Application Priority Data

Aug. 31, 2005 (JP) ............................. 2005-251831
Aug. 31, 2005 (JP) ............................. 2005-251951

(51) Int. Cl.
*H04N 1/04* (2006.01)
(52) U.S. Cl. ...................... 358/474; 358/400; 358/471; 358/494; 358/497
(58) Field of Classification Search ................ 358/400, 358/471, 474, 494, 497
See application file for complete search history.

(56) References Cited

U.S. PATENT DOCUMENTS 5,751,446 A     5/1998  Fujioka
6,836,633 B2 *  12/2004 Bannai et al. ............... 399/211

FOREIGN PATENT DOCUMENTS

| JP | 07-191415   | 7/1995    |
|----|-------------|-----------|
| JP | 10-145560   | 5/1998    |
| JP | 11-298653   | * 10/1999 |
| JP | 2001-144897 | 5/2001    |
| JP | 2005-173096 | 6/2005    |
| JP | 2005-255360 | 9/2005    |
| JP | 2006-184839 | 7/2006    |

OTHER PUBLICATIONS

Office Action mailed Mar. 16, 2010 for counterpart Japanese Patent Application No. 2005-251951.

* cited by examiner

*Primary Examiner*—Benny Q Tieu
*Assistant Examiner*—Martin Mushambo
(74) *Attorney, Agent, or Firm*—Harness, Dickey & Pierce, P.L.C.

(57) ABSTRACT

A driving-force transferring unit is extended in a predetermined direction, with a predetermined portion attached to a running unit. A driving unit changes a direction of movement of the driving-force transferring unit by rotating based on a driving force from a driving source. At least one pulley unit is rotatably attached to the case and supports the driving-force transferring unit. The pulley unit includes an outer ring member that is rotated by the driving-force transferring unit, an inner ring member that rotatably supports the outer ring member, and an engaging unit that is provided on the inner ring member, to engage with the case.

12 Claims, 13 Drawing Sheets

IMAGE READING DEVICE AND IMAGE FORMING APPARATUS

CROSS-REFERENCE TO RELATED APPLICATIONS

The present document incorporates by reference the entire contents of Japanese priority documents, 2005-251831 filed in Japan on Aug. 31, 2005 and 2005-251951 filed in Japan on Aug. 31, 2005.

BACKGROUND OF THE INVENTION

1. Field of the Invention

The present invention relates to an image forming apparatus equipped with an image reading device, and more particularly, to an image reading device that includes a pulley unit that supports a driving-force transferring unit for driving a scanning optical system and an image forming apparatus that includes the image reading device.

2. Description of the Related Art

An image reading device, which is generally included in an image forming apparatus such as a copying machine, a facsimile apparatus, or a multifunction product, employs a scanning optical system. The scanning optical system includes a light source, a plurality of mirrors, an imaging lens, and the like.

Generally, the light source and a first mirror are set on a first carriage, while a second mirror and a third mirror are set on a second carriage. Each carriage is configured to linearly move in a sub-scanning direction, pulled by a wire-driven pulley that rotates by a motor as a driving source, a carriage pulley that moves with a drive wire connected to the wire-driven pulley, and a plurality of idler pulleys rotatably arranged.

The idler pulleys are provided at four corners inside of a body of the image reading device and each pair of two idler pulleys extends a drive wire.

The first carriage moves in the longitudinal direction of the image reading device at a predetermined speed V and performs a sub-scanning of the document. The second carriage moves in the same moving direction as the first carriage at a half speed of the first carriage V/2. With this configuration, lights are irradiated from the light source onto a region of the document substantially positioned over the light source, reflected by a first mirror, a second mirror, and a third mirror, and the document is scanned using an imaging lens and a line sensor that performs a main-scanning of the document.

The drive pulley and the idler pulley are mounted at both ends of a side of a body frame in a direction perpendicular to a direction of movement of each carriage (the longitudinal direction). A direction of movement of the drive wire is changed by simultaneously driving each carriage mounted on the two rails (see, for example, Japanese Patent Application Laid-Open No. H11-298653).

FIG. 18 is a schematic for explaining a conventional idler pulley 1. The idler pulley 1 is mounted on a substrate member 3 with a ball bearing 2. The substrate member 3 is fixed to a body 5 of the image reading device using a bolt 4. The ball bearing 2 includes an outer ring member 6 on which the idler pulley 1 is fixed, an inner ring member 8 connected to the outer ring member 6 via a ball 7, and a fixing shaft 9 fitted to the inner ring member 8. When the idler pulley 1 is set on the body 5, the fixing shaft 9 is fixed to the substrate member 3 using, for example, a cashime and the substrate member 3 is fixed to the body 5 using the bolt 4. The drive wire (not shown) is hooked to a dual groove 1a and 1b formed on an outer periphery of the idler pulley 1.

However, when the idler pulley 1 is set in the body 5, the fixing shaft 9 is firstly fixed to the substrate member 3 using the cashime, and the substrate member 3 is further set on the body 5 using the bolt 4. Therefore, number of work units for setting the idler pulley 1 to the body 5 increases. As a result, an operation procedure for setting the idler pulley 1 is troublesome.

In addition, because the inner ring member 8 is provided on the substrate member 3 via the fixing shaft 9 and the ball bearing 2 is unified to the substrate member 3, there are problems that number of components increases and costs for manufacturing the idler pulley 1 increases.

Furthermore, because the idler pulley 1 is provided at each of four corners inside of the body 5, positions for providing the idler pulleys need to be optimized.

Specifically, the idler pulley 1, the fixing shaft 9, and the substrate member 3 are separate components and they need to be put together in the conventional configuration of the pulley unit. If the idler pulley 1 is to be provided at any region of the body 5, the shape of the substrate member 3 needs to be adjusted to the shape of the body 5. Conventionally, the idler pulley 1 is provided on the body 5 with the substrate member 3 optimized to the corresponding shape of the body 5. Namely, the idler pulley 1 with the substrate member 3 in different shapes is provided at each of the four corners inside of the body 5.

Accordingly, precision of providing the idler pulley 1 on the body 5 shows a fluctuation. As a result, it is difficult to run the carriage smoothly and stably using the drive wire.

SUMMARY OF THE INVENTION

It is an object of the present invention to at least partially solve the problems in the conventional technology.

An image reading device according to one aspect of the present invention includes a running unit on which a scanning optical system that optically scans a document is mounted, the running unit moving in a case; a driving-force transferring unit that is extended in a predetermined direction, of which a predetermined portion is attached to the running unit; a driving unit around which the driving-force transferring unit is wound, the driving unit changing a direction of movement of the driving-force transferring unit by rotating in a forward direction or in a backward direction based on a driving force from a driving source; and at least one pulley unit that is rotatably attached to the case and supports the driving-force transferring unit. The pulley unit includes an outer ring member that is rotated by the driving-force transferring unit; an inner ring member that rotatably supports the outer ring member; and an engaging unit that is provided on the inner ring member, to engage with the case.

An image forming apparatus according to another aspect of the present invention includes an image forming unit that forms an image on a recording medium; and an image reading device that reads an image. The image reading device includes a running unit on which a scanning optical system that optically scans a document is mounted, the running unit moving in a case; a driving-force transferring unit that is extended in a predetermined direction, of which a predetermined portion is attached to the running unit; a driving unit around which the driving-force transferring unit is wound, the driving unit changing a direction of movement of the driving-force transferring unit by rotating in a forward direction or in a backward direction based on a driving force from a driving source; and at least one pulley unit that is rotatably attached to the case and supports the driving-force transferring unit. The pulley unit includes an outer ring member that is rotated by the driving-force transferring unit, an inner ring member that rotatably supports the outer ring member, and an engaging unit that is provided on the inner ring member, to engage with the case.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
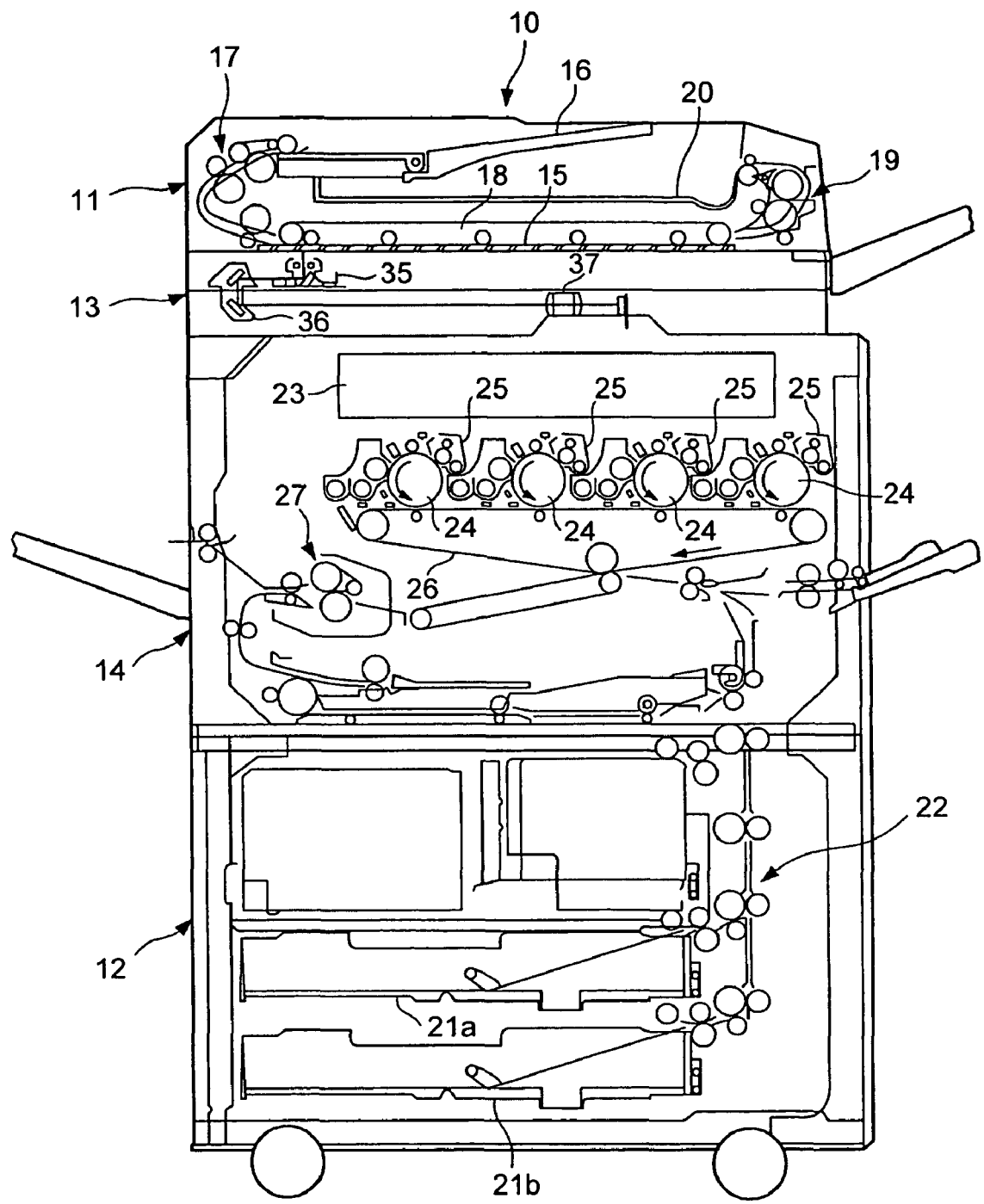
FIG. 1 is a schematic for explaining a general structure of an image forming apparatus according to an embodiment of the present invention.

Exemplary embodiments of the present invention are explained below in detail with reference to the accompanying drawings. The present invention is not limited to the embodiments explained below.

FIGS. 1 to 16 are drawings for explaining an image forming apparatus including an image reading device according to the present invention. In the drawings, a copying machine is explained as an example of the image forming apparatus. Alternately, the image forming apparatus can be other apparatuses such as a facsimile apparatus, a digital integrated machine, and the like as long as the apparatuses include the image reading device.

FIG. 1 is a schematic of the image forming apparatus according to an embodiment of the present invention. A copying machine 10 includes an automatic document feeder (ADF) 11, a paper feeder 12, an image reading device 13, and an image forming unit 14.

The ADF 11 transfers a document set in a document tray 16 onto a contact glass 15 using a paper separating unit 17 configured with various rollers such as a paper feeding roller and a paper separating roller. Once the document is scanned on the contact glass 15, the ADF 11 conveys the document from the contact glass using a conveying belt 18. Thereafter, the ADF 11 outputs the document to a paper output tray 20 using a paper output unit 19.

When both sides of the document are to be scanned, once one side is scanned, the document is transferred back from the paper output unit 19 to the contact glass 15 by using a branching machine provided at the paper output unit 19 and using the conveying belt 18 for scanning the other side of the document.

The paper feeder 12 includes paper cassettes 21a and 21b for storing recording papers in unique paper size. The paper feeder 12 also includes a paper feeding unit 22 including various rollers that conveys the recording papers stored in the paper cassettes 21a and 21b to a position for forming an image thereon.

A first carriage 35 and a second carriage 36 in the image reading device 13 move in a longitudinal direction so as to scan one side of the document using a light irradiated from a light source to the side. Scanned beams are refracted by a mirror and acquired into an image scanning sensor such as charge-coupled device (CCD) by a lens unit 37.

The image forming unit 14 includes an exposing unit 23 that generates a write signal based on a read signal acquired by the lens unit 37, a plurality of photoconductors 24 on which the write signal generated by the exposing unit 23 is formed, a development device 25 including toners filled with each monochrome color to be supplied to each of the photoconductors 24 for forming the write signal into monochrome toner images, a transfer belt 26 that transfers a full-color image, which is formed by superimposing the monochrome toner images formed on the photoconductors 24 on one another, onto a sheet paper fed from the paper feeder 12, and a fixing unit 27 that fixes the superimposed full-color image onto the sheet paper.

Figure 2:
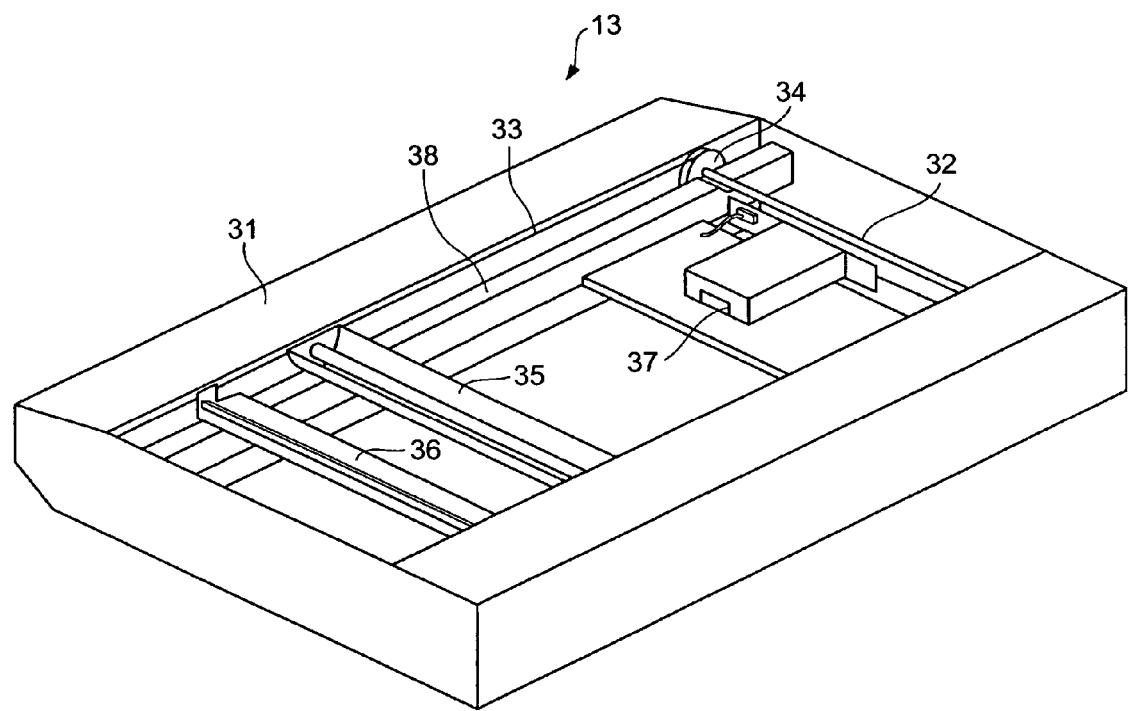
FIG. 2 is a perspective view of an image reading device provided in the image forming apparatus shown in FIG. 1.
Figure 3A:
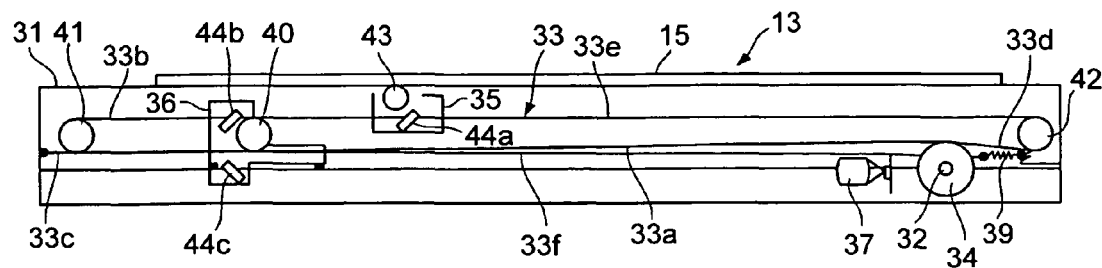
FIG. 3A is a front view of the image reading device shown in FIG. 2.
Figure 3B:
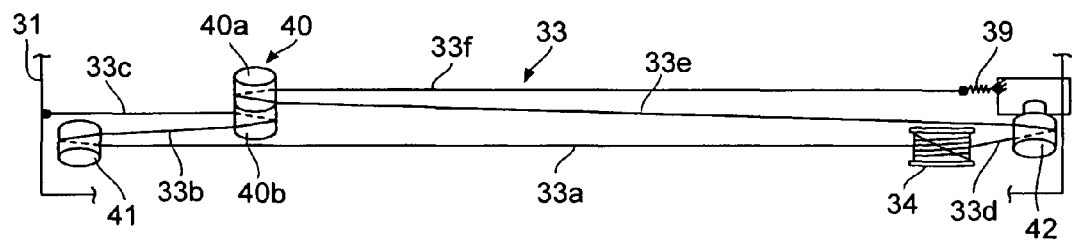
FIG. 3B is a perspective view of the image reading device shown in FIG. 2.

FIG. 2 is a perspective view of the image reading device 13. FIGS. 3A and 3B are schematics for explaining an arrangement of a drive wire 33 for driving the second carriage 36 and each pulley. FIG. 3A is a front view of the image reading device 13. FIG. 3B is a top view for explaining an arrangement of connecting the drive wire 33.

The image reading device 13 includes a body frame 31, a drive shaft 32, the drive wire 33, a wire-driven pulley 34, the first carriage 35, the second carriage 36, the lens unit 37, a second rail 38, a tensile spring 39, a carriage pulley 40, and idler pulleys 41 and 42.

The body frame 31 makes a part of a package of the copying machine 10. The body frame 31 includes a first rail (not shown) and the second rail 38 therein. The first carriage 35 is movably mounted on the first rail as a running unit while the second carriage 36 is movably mounted on the second rail 38 as a running unit.

The drive shaft 32 is coupled to a motor and two of the wire-driven pulleys 34 are mounted at the end portions of the drive shaft 32. The drive wire 33 as a driving-force transferring unit is wound up around the wire-driven pulley 34. The drive wire 33 is extended in a longitudinal direction according to FIG. 1.

The drive wires 33 are used for driving the first carriage 35 and the second carriage 36. However, in FIGS. 3 and 4, only the drive wire 33 for the second carriage 36 is described.

A first set of the drive wire 33 and the idler pulleys 41 and 42 is set in a first side of the image reading device 13 and a second set of a drive wire and two idler pulleys is set in a second side facing to the first side. Because the first set and the second set have the same configuration, only the first set of the drive wire 33 and the idler pulleys 41 and 42 are explained. With the embodiment, there are two pairs of the idler pulleys 41 and 42 provided at four corners inside of the image reading device 13 and two drive wires are extended over each pair of the idler pulleys 41 and 42.

The carriage pulley 40 is mounted on the second carriage 36. The drive wire 33 is extended via the carriage pulley 40 and the idler pulleys 41 and 42.

A tubular lamp 43 used as a light source and a first mirror 44a is set on the first carriage 35. The first carriage 35 is placed between the wire-driven pulley 34 and the second carriage 36. When the drive wire 33 pulls the first carriage 35 to drive at a predetermined speed V, the tubular lamp 43 scans a document placed on the contact glass 15 in the vertical direction (sub-scanning).

When the tubular lamp 43 irradiates light to the surface of the document, beams reflected from the surface of the document are reflected by the first mirror 44a in a predetermined direction, that is, in a direction toward the second carriage 36. The beams reflected by the first mirror 44a are further reflected by a second mirror 44b and a third mirror 44c set on the second carriage 36 and enter into the lens unit 37.

Thereafter, the reflected beams are condensed to be formed into an image on an image sensor such as CCD (not shown) placed on a focal plane using an imaging lens included in the lens unit 37. Accordingly, the image reading sensor scans lines on the surface of the document along with a movement of the tubular lamp 43 in a horizontal direction (main-scanning).

The second carriage 36 moves in the same direction as the moving direction of the first carriage 35 at a half speed of the first carriage 35 (V/2), so that overlapped light paths caused by the reflected beams from the second mirror 44b and the third mirror 44c are counterbalanced.

According to the difference of the moving speeds between the two carriages, light path length of light beams from the surface of the document to the lens unit 37 becomes constant even when the first carriage 35 and the second carriage 36 moves. According to the embodiment, the tubular lamp 43, the first mirror 44a, the second mirror 44b, and the third mirror 44c are included in a scanning optical system.

Because s running distance of the second carriage 36 is half of that of the first carriage 35, half of the second rail 38 in a region near the wire-driven pulley 34 is not used for the running by the second carriage 36. On the other hand, if the region unused by the second carriage 36 is omitted from the configuration, it causes a negative impact, such that the second rail 38 cannot be configured in parallel. According to the embodiment, the drive shaft 32 of the wire-driven pulley 34 is arranged in the region unused by the second carriage 36 and a portion of the drive shaft 32 is overlapped with a surface of the second rail 38.

In the overlapped region, a shape of the second rail 38 is modified so that the second rail 38 does not affect to a rotation of the drive shaft 32. Conventionally, an upper end portion of the drive shaft 32 is arranged under the surface of the second rail 38. On the contrary, in the embodiment of the present invention, the upper end portion of the drive shaft 32 is arranged above the surface of the second rail 38, resulting in enabling to put the wire-driven pulley 34 closer to the surface of the document. As a result, a size of the copying machine 10 can be reduced.

The lens unit 37 is arranged so that the first carriage 35 can run over the lens unit 37. At the same time, the lens unit 37 is arranged in the region unused for the running by the second carriage 36 so as to receive the beams reflected from the surface of the document. In the conventional configuration, because the upper end portion of the drive shaft 32 is arranged under the surface of the second rail 38, a distance between the wire-driven pulley 34 and the idler pulleys 41 and 42 is large in the lengthwise direction. Further, because of the arrangement for extending the drive wire 33, it is difficult to put the wire-driven pulley 34 closer to the idler pulleys 41 and 42.

In the embodiment according to the present invention, the drive shaft 32 can be arranged in a position that comes into contact with the top surface of the second rail 38. Therefore, the wire-driven pulley 34 can be put closer to the idler pulleys 41 and 42 in the lengthwise direction. Further, by arranging the wire-driven pulley 34 on the backside of the lens unit 37 (when viewed in the running direction of scanning), the portion of the second rail 38 in which the shape is modified can be placed in the region unused for the running by the second carriage 36.

As shown in FIG. 3, the drive wire 33 is wound around the wire-driven pulley 34 and both end portions of the drive wire 33 is respectively extended in a right direction and a left direction. A drive wire 33a extended in the left direction is twisted by the idler pulley 41 which shaft is fixed to the body frame 31. The twisted wire is a drive wire 33b shown in FIG. 3, which is further extended to an outer carriage pulley 40b. The drive wire 33b is further twisted by the outer carriage pulley 40b, which is a drive wire 33c shown in FIG. 3. The drive wire 33c is extended to the idler pulley 41 to be fixed thereto.

A drive wire 33d extended in the right direction is twisted by the idler pulley 42 which shaft is fixed to the body frame 31. The twisted wire is a drive wire 33e shown in FIG. 3, which is further extended to an inner carriage pulley 40a. The drive wire 33e is further twisted by the inner carriage pulley 40a, which is a drive wire 33f shown in FIG. 3. The drive wire 33f is extended to the tensile spring 39 of a spring member and fixed to the idler pulley 42 via the tensile spring 39.

With a rotation of the wire-driven pulley 34, the carriage pulley 40 and the second carriage 36 move together in a longitudinal direction along with the second rail 38. Therefore, the drive wires 33b and 33c, which are used by the carriage pulley 40, need to be configured in parallel to the second rail 38. Otherwise, a constant moving speed of the second carriage 36 is not secured. With the same reason, the drive wires 33e and 33f are configured in parallel to the second rail 38. On the other hand, the drive wires 33a and 33b need not to be configured in parallel to the second rail 38 because the carriage pulley 40 does not move between the wire-driven pulley 34 and the idler pulleys 41 and 42.

The inner carriage pulley 40a and the outer carriage pulley 40b are configured in a single carriage using a concentric structure forming a dual groove thereon.

The shafts of the idler pulleys 41 and 42 are set inclined and the shaft of the carriage pulley 40 is also set inclined. However, the shafts of the idler pulleys 41 and 42 are inclined in the opposite direction of that of the carriage pulley 40. Namely, assuming that the drive shaft 32 of the wire-driven pulley 34 is set in a horizontal direction, the shafts of the idler pulleys 41 and 42 are inclined in a clockwise direction while the shaft of the carriage pulley 40 is inclined in a counter-clockwise direction. In this document, the direction of the shafts of the idler pulleys 41 and 42 is called a clockwise inclination while the direction of the shaft of the carriage pulley 40 is called a counter-clockwise inclination.

A reason for inclining the shafts is to configure so that the carriage pulley 40 is mounted on the second carriage 36 at an upper position in the lengthwise direction for downsizing the copying machine 10. A starting position of winding the drive wire 33a to the idler pulley 41 slightly shifts toward the shaft of the idler pulley 41 according to a rotation of the wire-driven pulley 34. In a region where the drive wire 33a and the second carriage 36 are in the closest position, the drive wire 33a and the second carriage 36 come into contact with each other when using a conventional technique. Thus, the idler pulley 41 is inclined so that the drive wire 33a and the carriage pulley 40 can be out of touch from each other. As a result, the drive wire 33a and the carriage pulley 40 do not come into contact with each other.

Figure 4:
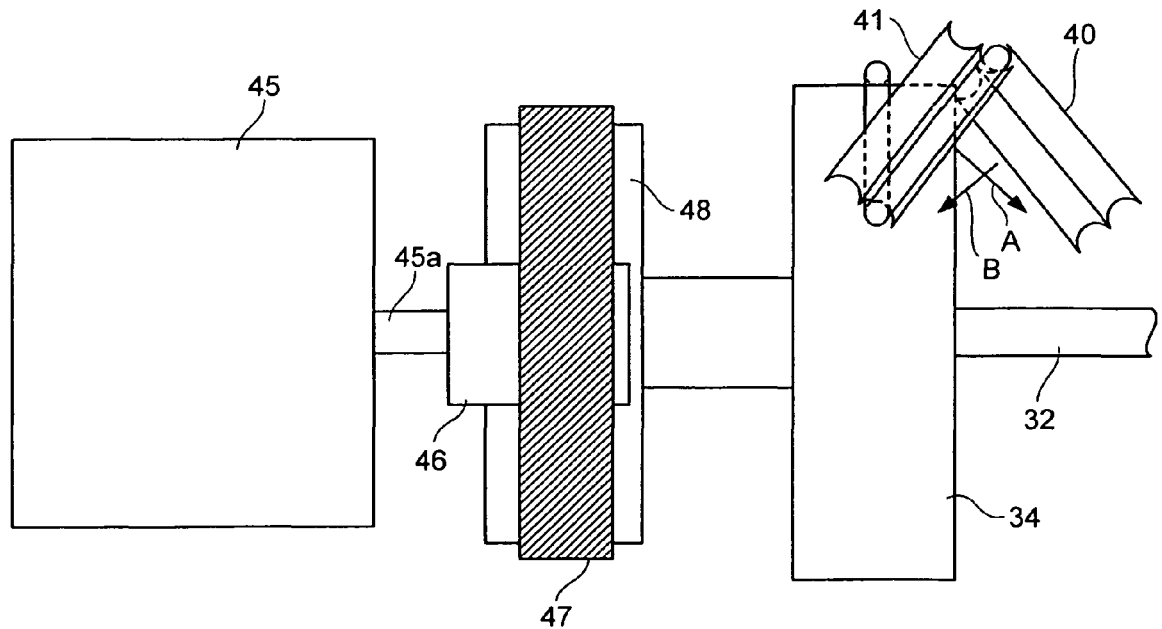
FIG. 4 is a schematic for explaining an arrangement of an idler pulley, a carriage pulley, and a motor in the image reading device shown in FIG. 2.

FIG. 4 is a schematic for explaining an arrangement of the pulleys and a motor in an extending direction of the drive wire 33 in the image reading device 13. A drive belt pulley 46 is mounted on an output shaft 45a of a drive motor 45 and connected to a drive belt pulley 48 via a drive belt 47.

The drive belt pulley 48 is coupled to the drive shaft 32. Upon transmitting a driving force from the drive motor 45 via the drive belt 47, the drive belt pulley 48 moves for a forward-reverse rotation to change a driving direction of the drive wire 33. According to the embodiment, the drive motor 45 and the drive belt 47 are included in a driving unit.

The drive shaft 32 of the wire-driven pulley 34 is arranged in a horizontal direction as shown in FIG. 4. The idler pulley 41 is arranged so as to be inclined in a counter clockwise direction as shown with an arrow A in FIG. 4. On the contrary, the carriage pulley 40 is arranged so as to be inclined in a counter-clockwise direction as shown with an arrow B in FIG. 4.

Each center point of the wire-driven pulley 34, the idler pulley 41, and the carriage pulley 40 is arranged from the outside to the inside of the body frame 31, in that order, along with a direction of the drive shaft 32.

Above arrangement is for decreasing an entire height of the copying machine 10. However, an upper end portion of the wire-driven pulley 34 is positioned under an upper end portion of the idler pulley 41 so that the drive wire 33 and the wire-driven pulley 34 do not come into contact with each other. The same arrangement is applied to the idler pulley 42.

The drive wire 33 is extended from the wire-driven pulley 34 to the idler pulley 41 so that the drive wire 33 is arranged along with a substantial tangent line of the wire-driven pulley 34. The starting point for winding the drive wire 33 around the idler pulley 41 is on an extended line of the same tangent line. However, actual starting point, which is a contact point at the idler pulley 41 when assumed that the drive wire 33 corresponds to the tangent line, is slightly shifted toward the shaft. Thus, the above conditions are for substantial positions.

The drive wire 33 is extended from the idler pulley 41 to the carriage pulley 40 so that the drive wire 33 is arranged along with a tangent line of the idler pulley 41 and the carriage pulley 40. Namely, the drive wire 33 corresponds to an external common tangent line of the idler pulley 41 and the carriage pulley 40.

Thus, the starting points on the idler pulley 41 and the carriage pulley 40 are overlapped in FIG. 4. The drive wire 33 on other region of the idler pulley 41 and the carriage pulley 40 is omitted. The same arrangement is applied to the idler pulley 42.

With the above arrangement, the drive wire 33 is less overlapped in a vertical direction. Thereby, the drive wire can be easily wound around the pulleys. Further, excess stress is not applied to the drive wire 33. Therefore, the drive wire can stably transmit the driving force.

Because the idler pulleys 41 and 42 are inclined in the configuration, the height of the image reading device 13 can be short. As a result, the height of the copying machine 10 can be short.

Figure 5:
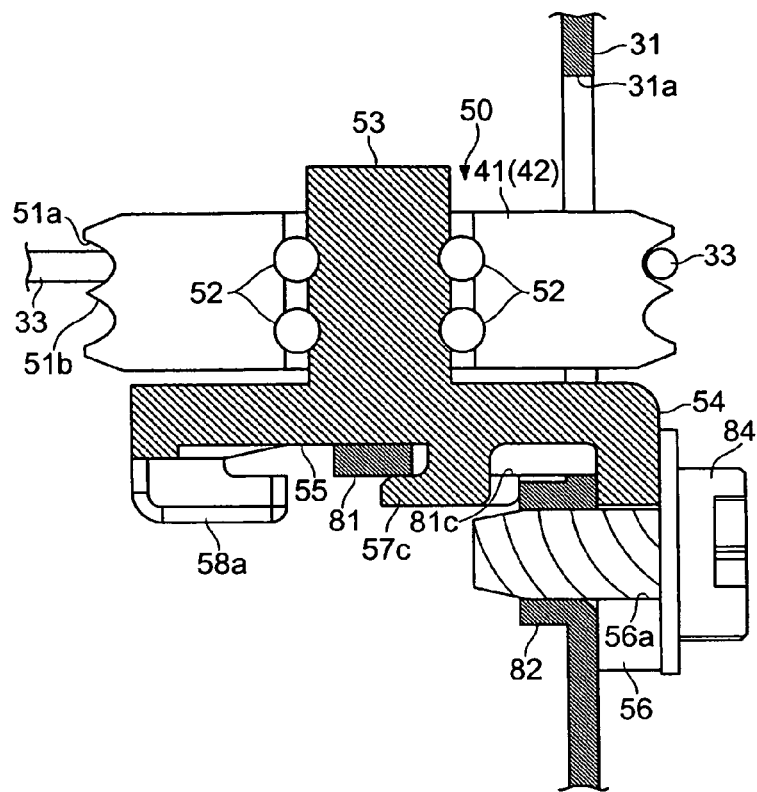
FIG. 5 is a cross section of a pulley unit provided in the image reading device and a body frame of the image reading device.

FIG. 5 is a schematic for explaining a structure of the idler pulleys 41 and 42. The idler pulleys 41 and 42 are in the same shape. A dual groove is formed on the idler pulleys 41 and 42 for winding the drive wire 33. The idler pulleys 41 and 42 are included in an outer ring member.

The idler pulleys 41 and 42 are rotatably connected to a support shaft 53 via a ball member 52 and the support shaft 53 is integrated to an engagement substrate 54.

The idler pulleys 41 and 42, the support shaft 53, and the engagement substrate 54 are made of, for example, plastic while the ball member 52 is made of rubber. The idler pulleys 41 and 42, the support shaft 53, and the engagement substrate 54 can be made of metal.

Figure 11:
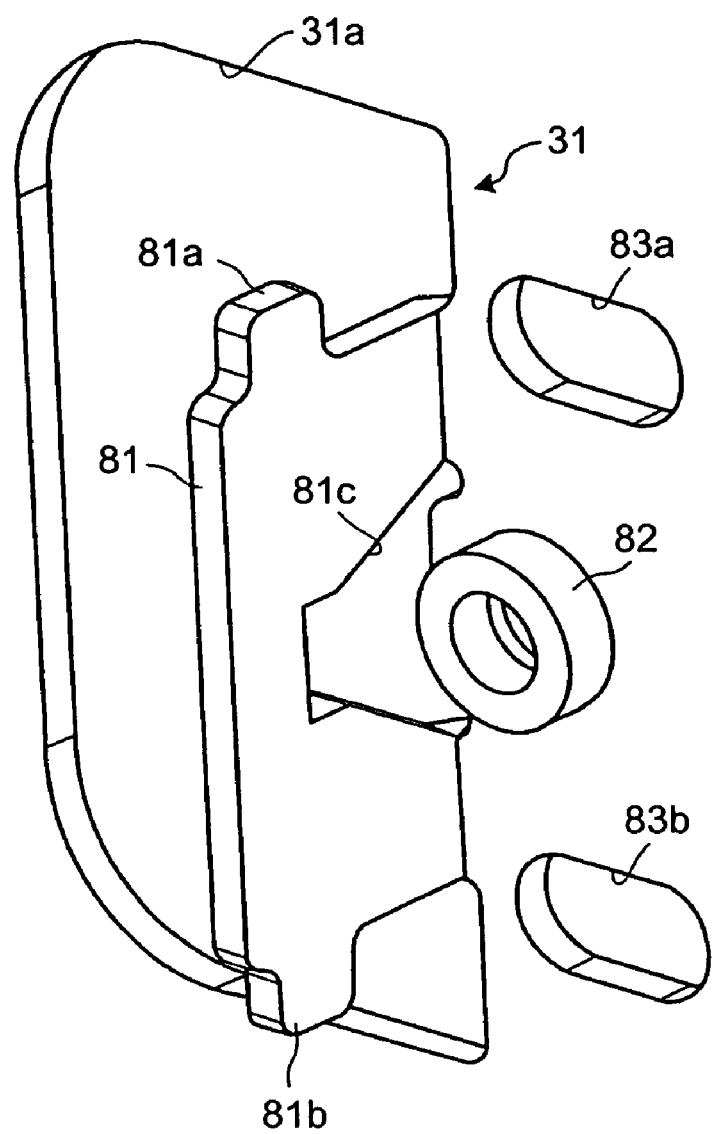
FIG. 11 is a schematic of a main body frame of the image reading device viewed from an inside of the image reading device.
Figure 12:
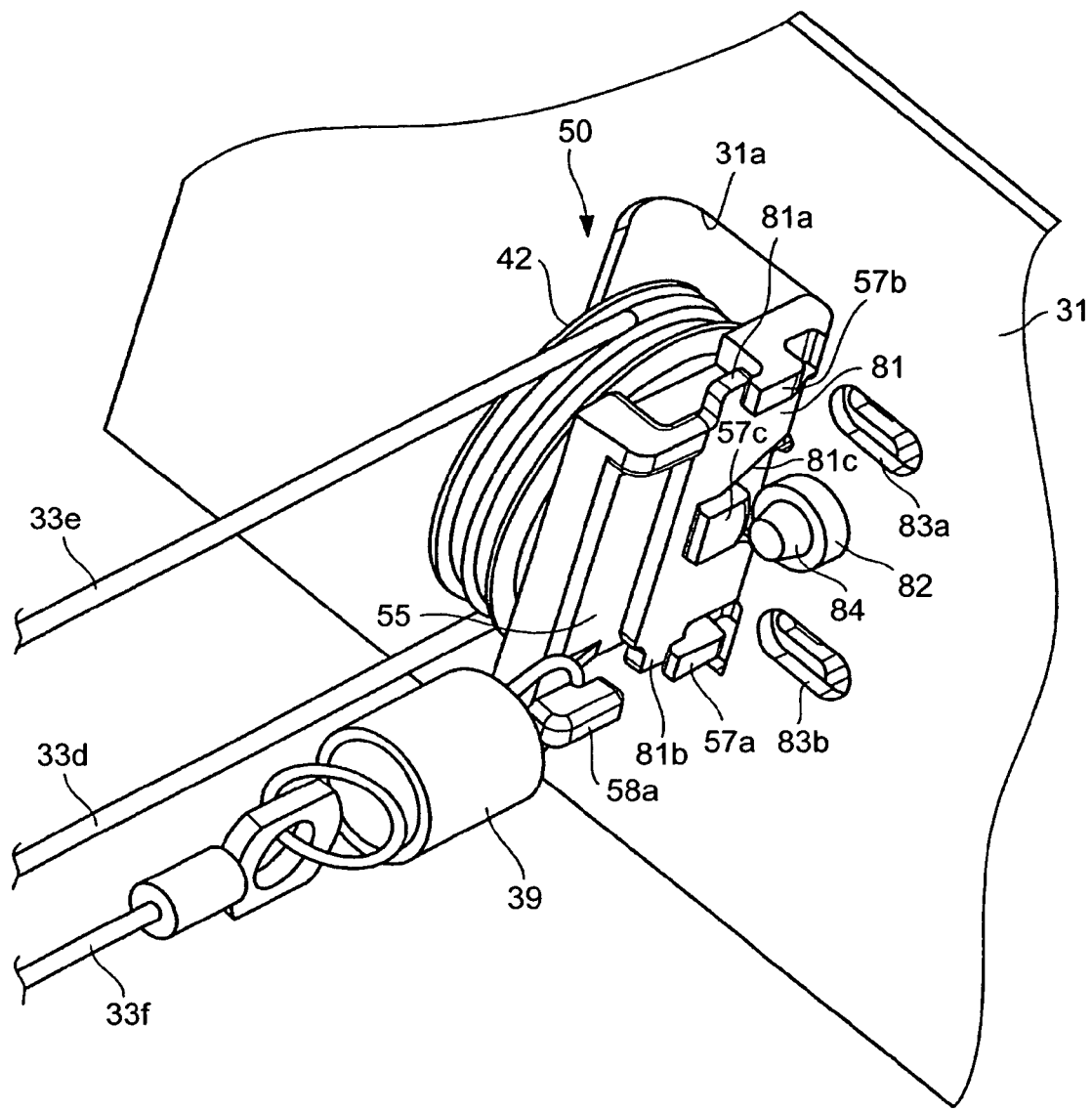
FIG. 12 is a schematic for explaining a first arrangement of the pulley unit and a drive wire viewed from the inside of the image reading device.
Figure 13:
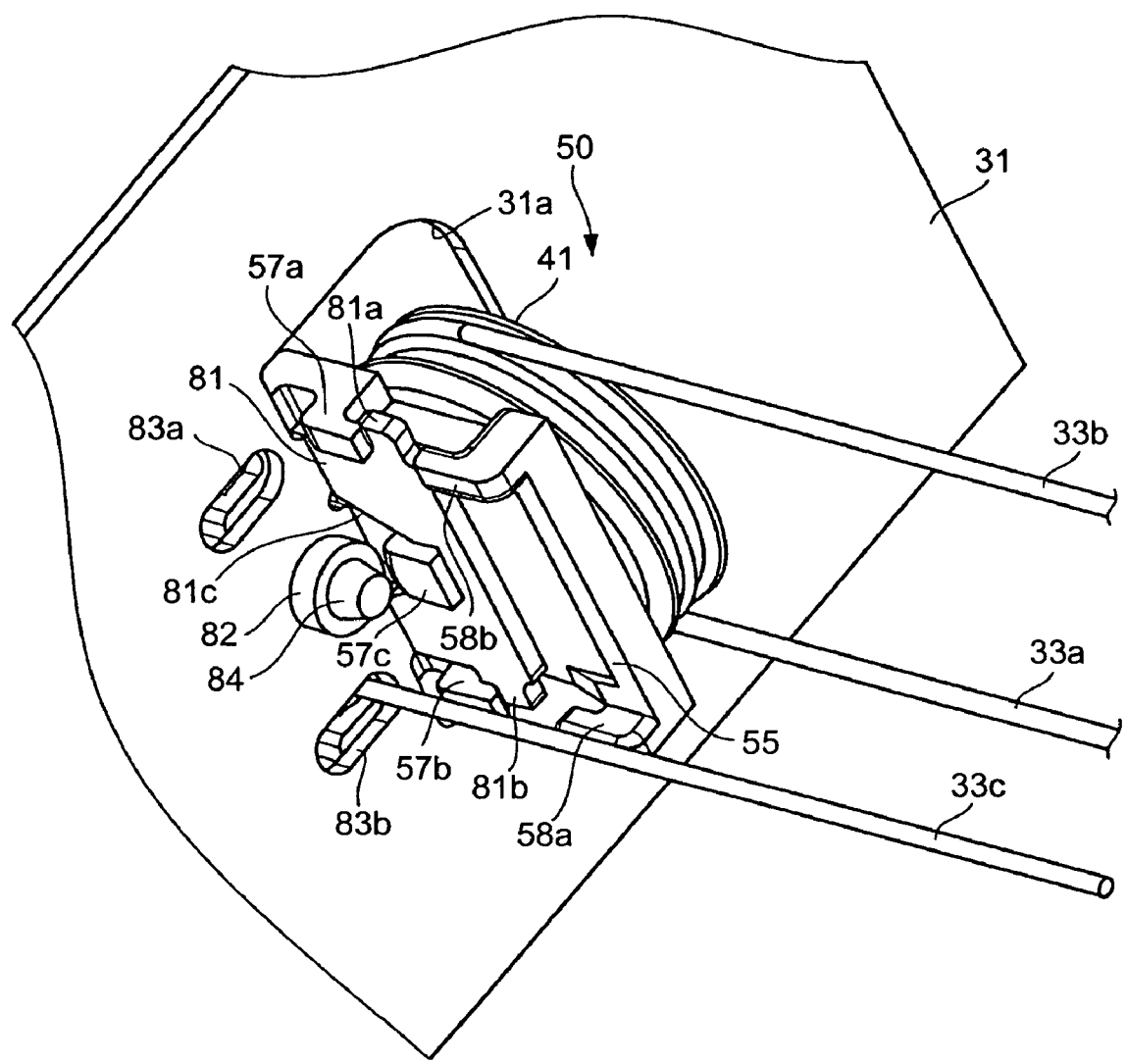
FIG. 13 is a schematic for explaining a second arrangement of the pulley unit and a drive wire viewed from the inside of the image reading device.

As shown in FIGS. 6 to 10, the engagement substrate 54 is in L-shape and includes a plane area 55 that stands the support shaft 53 thereon and a bending portion 56 that is bent substantially at 90 degrees from the plane area 55. As shown in FIGS. 5 and 11, opening portions 31a are formed at the four corners inside of the body frame 31. A folding portion 81 folded from the body frame 31 is formed on the body frame 31 so that the folding portion 81 bulges outward toward the inside of the body frame 31.

Claws 81a and 81b are formed respectively in an upper area and a lower area of the folding portion 81, and a notch portion 81c is formed in a center area of the folding portion 81. The notch portion 81c is formed in a taper shape with which the end portion becomes thinner from the periphery of the body frame 31 toward the inside of the body frame 31.

A bolt inserting portion 82 is formed in a region of the body frame 31 adjacent to the opening portion 31a across the folding portion 81. A screw groove is formed on an inner surface of the bolt inserting portion 82 for screwing a bolt therein.

Opening portions 83a and 83b are formed respectively in an upper area and a lower area of the bolt inserting portion 82 so that the drive wire 33 is inserted therein.

Figure 6:
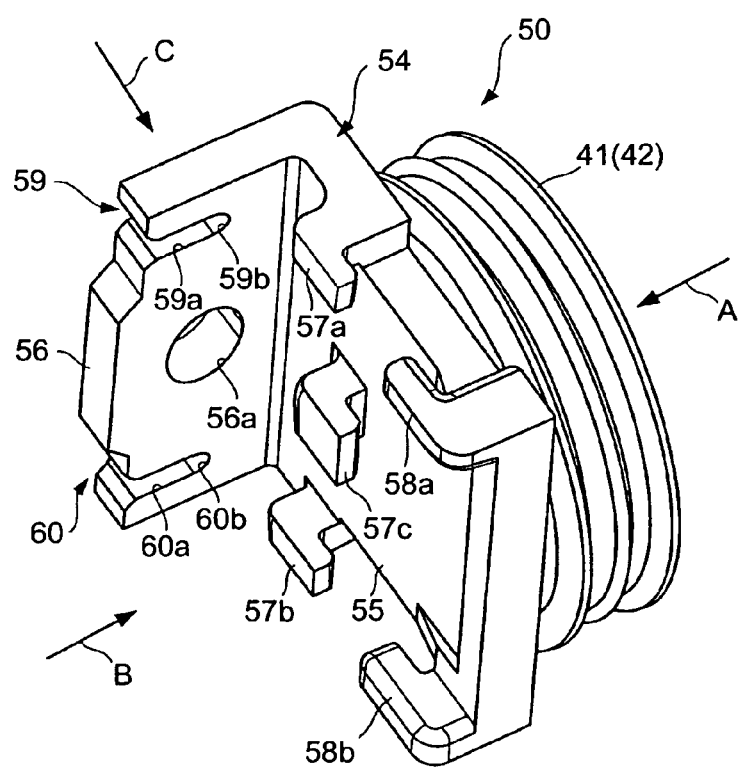
FIG. 6 is a perspective view of the pulley unit shown in FIG. 5.
Figure 7:
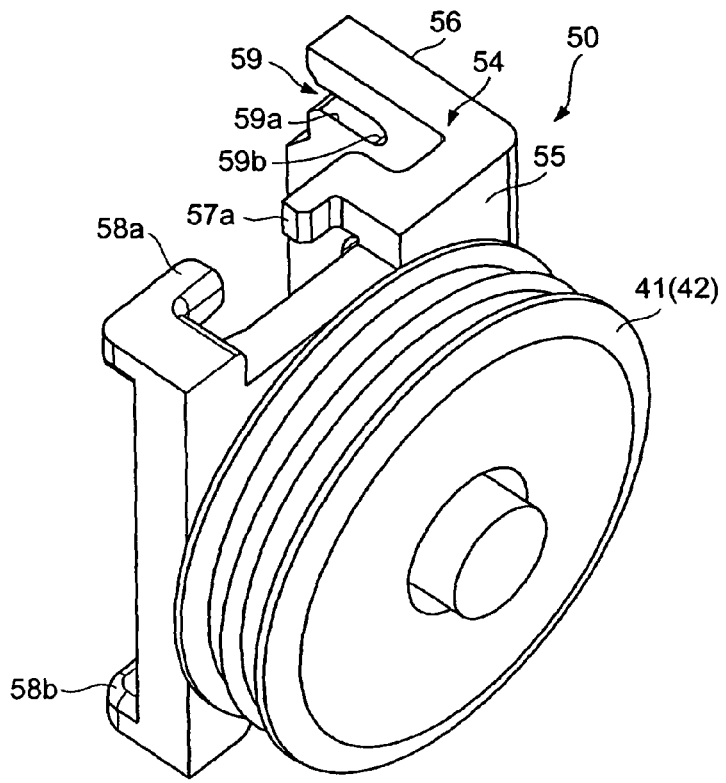
FIG. 7 is a perspective view of the pulley unit from a direction A shown in FIG. 6.
Figure 8:
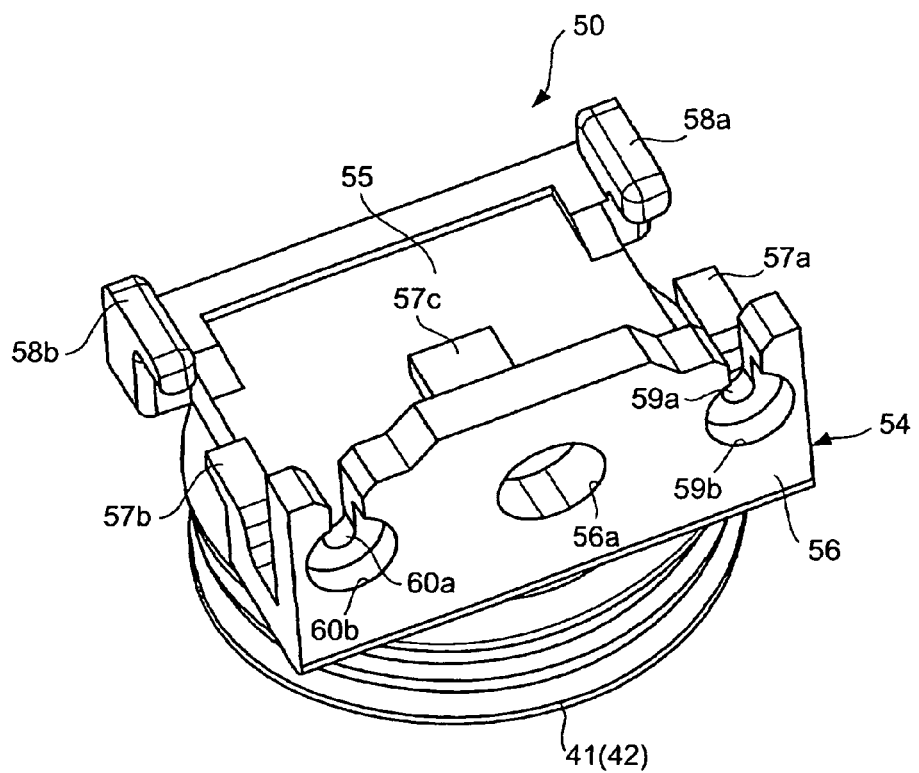
FIG. 8 is a perspective view of the pulley unit from a direction B shown in FIG. 6.
Figure 9:
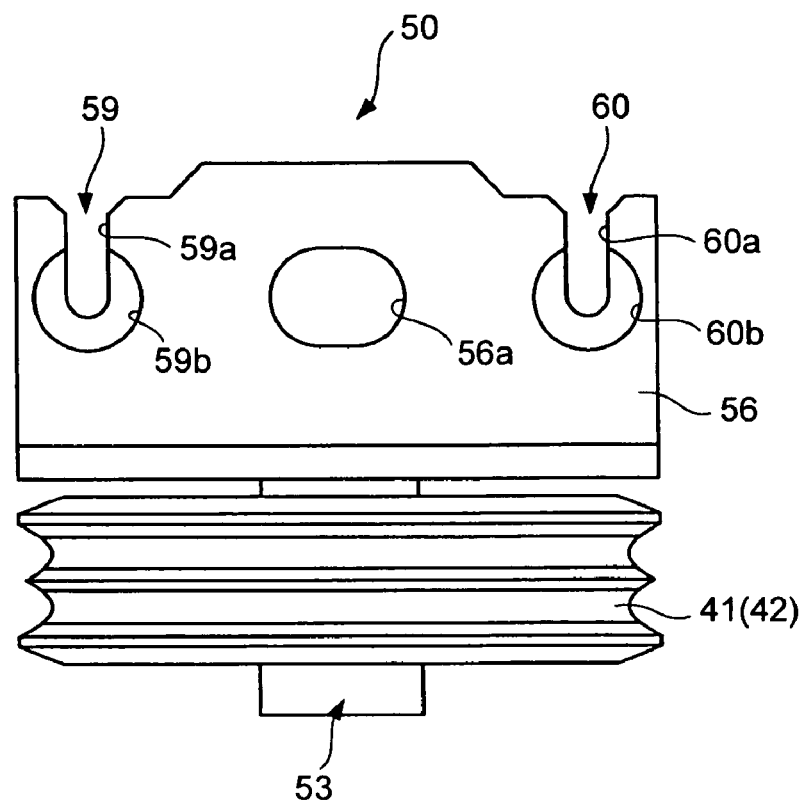
FIG. 9 is a perspective view of the pulley unit from a direction C shown in FIG. 6.
Figure 10:
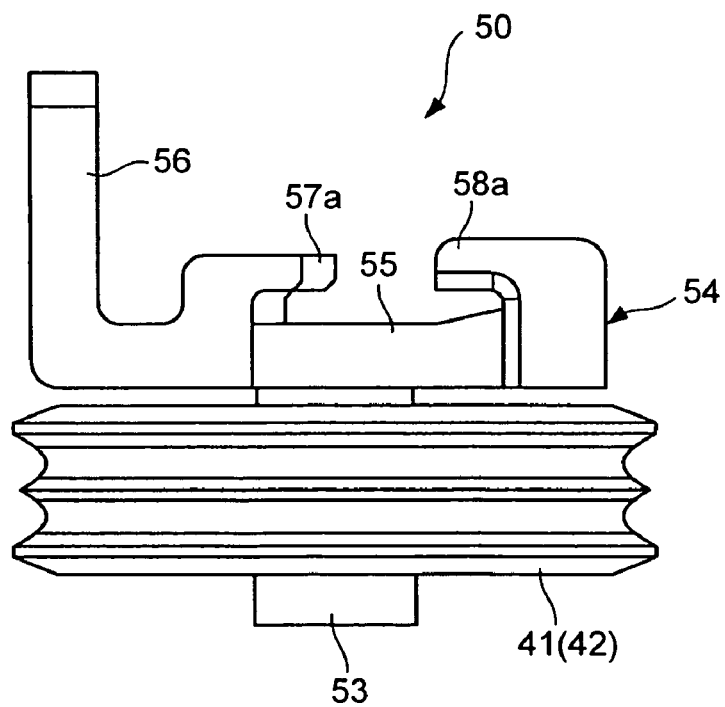
FIG. 10 is a top view of the pulley unit shown in FIG. 6.

End hooks 57a and 57b are formed respectively in an upper area and a lower area of the plane area 55 as a body engaging member. The end hooks 57a and 57b are to be engaged respectively with the claws 81a and 81b on the folding portion 81. The end hooks 57a and 57b are symmetrically placed against a plane including the center shaft of the support shaft 53. In FIG. 6, the end hooks 57a and 57b are symmetrically placed against a plane including a center shaft of the support shaft 53 in a vertical direction.

A center hook 57c is formed in a substantial center area of the plane area 55. The center hook 57c is configured so as to be engaged with the notch portion 81c on the folding portion 81. According to the embodiment, the plane area 55 is included in a second engagement area that is engaged with the folding portion 81.

The bending portion 56 is included in a first engagement area that is engaged with the outside of the body frame 31 via the opening portion 31a on the body frame 31. A bolt inserting hole 56a in a long-hole shape is formed on the bending portion 56.

According to the embodiment, the end hooks 57a and 57b and the center hook 57c are respectively engaged with the claws 81a and 81b and the notch portion 81c, the plane area 55 is engaged with the folding portion 81, the bending portion 56 is in contact with the outside of the body frame 31, and a bolt 84 is screwed into the bolt inserting portion 82 via the bolt inserting hole 56a as shown in FIG. 5. As a result, the idler pulleys 41 and 42 can be fixed to the body frame 31.

Spring hooks 58a and 58b are formed respectively in an upper area of the plane area 55 as a rubber engagement area that is bent in L-shape outward of the body frame 31. The tensile spring 39 is engaged with the spring hooks 58a and 58b. According to the embodiment, one end portion of the drive wire 33 is set on the engagement substrate 54 of the idler pulley 42 via the tensile spring 39.

The spring hooks 58a and 58b are symmetrically placed against a plane including the center shaft of the support shaft 53. In FIG. 6, the spring hooks 58a and 58b are symmetrically placed against a plane including the center shaft of the support shaft 53 in a vertical direction.

The tensile spring 39 is engaged either with the spring hook 58a or the spring hook 58b. According to the embodiment, the spring hooks 58a and 58b are formed respectively in the upper area and the lower area of the plane area 55 so that the tensile spring 39 can be used in the same positions regardless of the positions of the idler pulleys 41 and 42 provided at corners from among the four corners inside of the body frame 31.

Wire engaging portions 59 and 60 are formed respectively in an upper area and a lower area of the bending portion 56 to engage the end portion of the drive wire 33 therewith as a driving-force transferring unit engaging member. The wire engaging portion 59 and 60 are formed in a notched shape, and include grooves 59a and 60a for hooking the drive wire 33 and also include concave portions 59b and 60b with wider width than those of the grooves 59a and 60a.

The wire engaging portion 59 and 60 are symmetrically placed against a plane including the center shaft of the support shaft 53. In FIG. 6, the wire engaging portion 59 and 60 are symmetrically placed against a plane including the center shaft of the support shaft 53 in the vertical direction.

Figure 14:
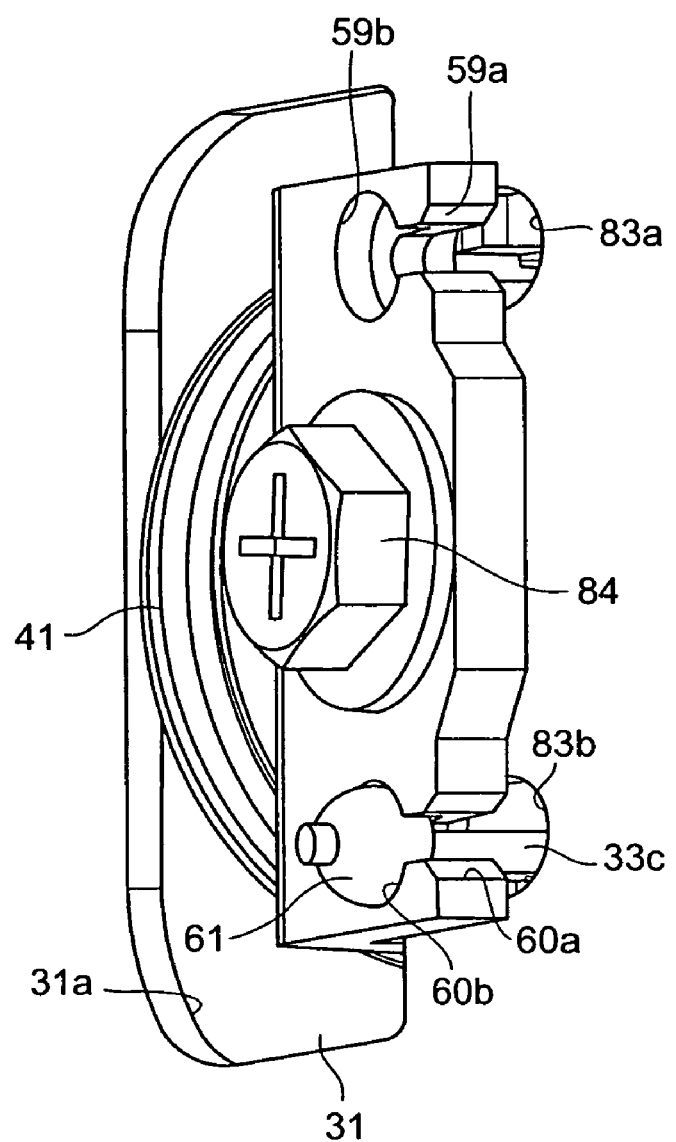
FIG. 14 is a schematic for explaining a first arrangement of the pulley unit and a drive wire viewed from an outside of the image reading device.
Figure 15:
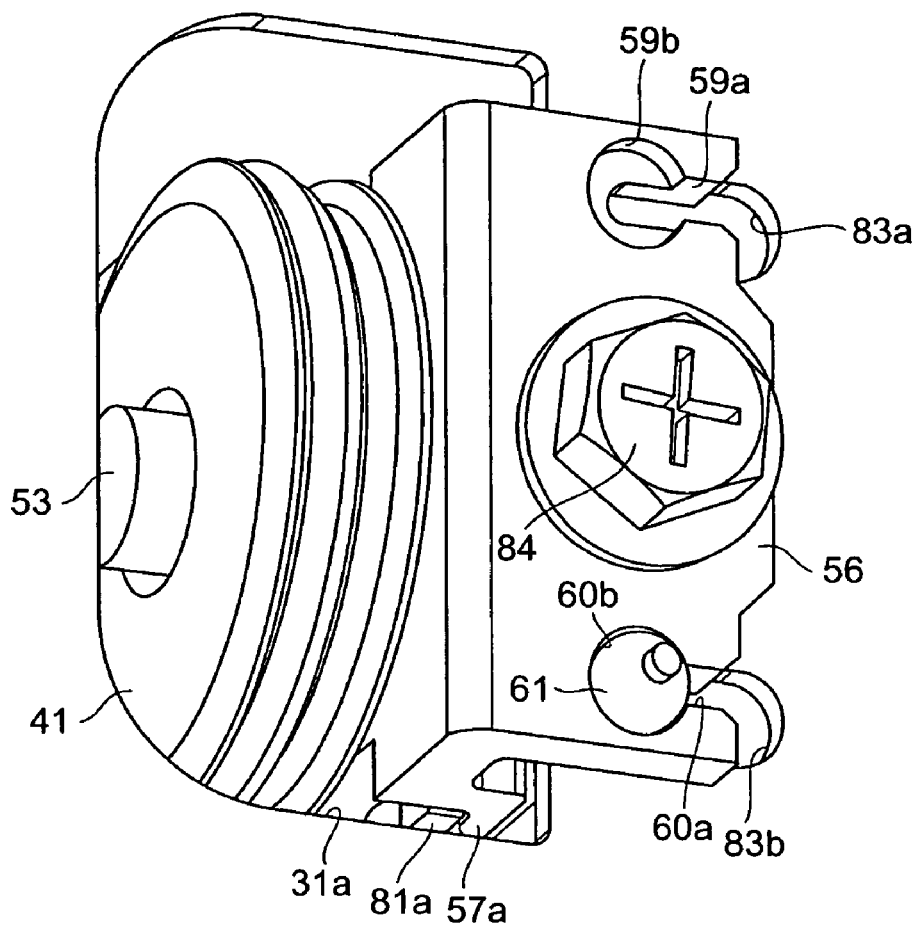
FIG. 15 is a schematic for explaining a second arrangement of the pulley unit and a drive wire viewed from the outside of the image reading device.

At other end portion of the drive wire 33, a fitting member 61 in a ball shape is set (see, FIGS. 14 and 15). The fitting member 61 is configured to engage with the concave portions 59b and 60b. According to the embodiment, the other end portion of the drive wire 33 is attached to the engagement substrate 54 of the idler pulley 41.

According to the embodiment, the idler pulleys 41 and 42, the ball member 52, the support shaft 53, and the engagement substrate 54 are included in a pulley unit 50. The support shaft 53 and the engagement substrate 54 are included in an inner ring member. The idler pulleys 41 and 42 are rotatably supported by the body frame 31 using a ball bearing.

Instead, the idler pulleys 41 and 42 can be rotatably supported by the body frame 31 using a fluid dynamic bearing that arranges fluid such as lubricating oil or air between the idler pulleys 41 and 42, and the support shaft 53. Alternately, the idler pulleys 41 and 42 can be rotatably supported by the body frame 31 using a magnetic dynamic bearing that arranges magnetic materials between the idler pulleys 41 and 42, and the support shaft 53 and magnetic strength of the magnetic material is adjusted by an adjusting unit.

Figure 16:
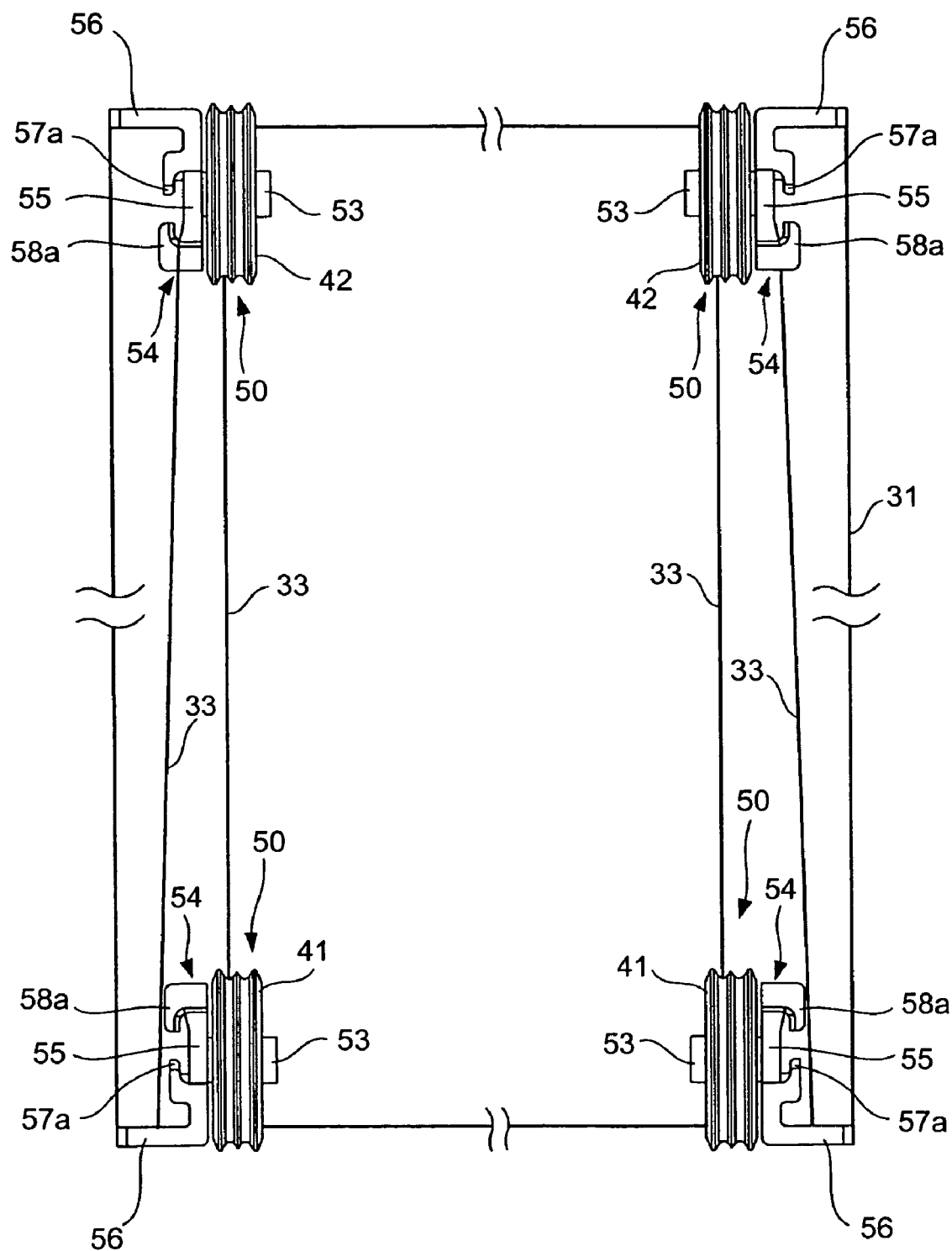
FIG. 16 is a schematic for explaining an arrangement of the pulley unit according to the present invention.

In FIG. 16, the pulley units 50 are provided at the four corners inside of the body frame 31 and include two pairs of the idler pulleys 41 and 42. Each pair includes the drive wires 33 extended between the idler pulleys 41 and 42.

Two of the pulley units 50 on one side of the body frame 31 and other two of the pulley units 50 on the other side of the body frame 31 have the same shape. The idler pulleys 41 and 42 are arranged at the opposite corners on the same sides.

The pulley unit 50 on the one side of the body frame 31 is half turned against a horizontal line perpendicular to the center shaft of the support shaft 53 and faces to the other pulley unit 50 on the other side of the body frame 31. Namely, the pulley unit 50 on the one side and the other pulley unit 50 on the other side are arranged as if they are reflected in a mirror.

Next, a configuration for mounting the idler pulleys 41 and 42 is explained. Because the configuration for mounting the idler pulleys 41 and 42 is the same, only about the idler pulley 41 is explained in detail.

The plane area 55 is arranged in the body frame 31 through the opening portion 31a of the body frame 31 and the idler pulley 41 is placed in the body frame 31 along with a surface of the body frame 31. The end hooks 57a and 57b are engaged with the claws 81a and 81b and the center hook 57c is engaged with the notch portion 81c. As a result, the plane area 55 is engaged with the folding portion 81.

The bending portion 56 is made in contact with the outside of the body frame 31. The bolt 84 is screwed into the bolt inserting portion 82 through the bolt inserting hole 56a to fix the idler pulleys 41 and 42 to the body frame 31. As a result, the idler pulleys 41 and 42 are fixed to the body frame 31.

Next, one end portion of the drive wire 33 is inserted into the body frame 31 via the groove 60a of the bending portion 56, the concave portion 60b, and the opening portion 83b. The fitting member 61 placed on the other end portion of the drive wire 33 is engaged with the concave portion 60b by pulling the drive wire 33 from the inside of the body frame 31.

The drive wire 33 is extended and wound around the idler pulley 41, the carriage pulley 40, the wire-driven pulley 34, and the idler pulley 42. The tensile spring 39 placed at the other end portion of the drive wire 33 is hooked onto the spring hook 58a provided on the plane area 55 of the idler pulley 42. As a result, the drive wire 33 is extended with certain strength in the body frame 31.

After the idler pulleys 41 and 42 are provided, when the positions of the idler pulleys 41 and 42 are misaligned due to a dispersion of the size of the engagement substrate 54, the positions of the idler pulleys 41 and 42 are adjusted by correcting the positions of the engagement substrate 54 and the bolt 84.

According to the present invention, the idler pulleys 41 and 42 are provided at the four corners inside of the body frame 31. The idler pulleys 41 and 42 rotate with the drive wire 33, and include the support shaft 53, which rotatably supports the idler pulleys 41 and 42 with the ball member 52, and the engagement substrate 54, which is integrated to the support shaft 53 and engaged with the body frame 31. Thus, only the engagement substrate 54 of the pulley unit 50 is needed to be fixed to the body frame 31. As a result, operation efficiency for setting the pulley unit 50 can be improved.

Further, it is configured so that the engagement substrate 54 is directly fixed to the body frame 31. Thereby, number of components in the pulley unit 50 can be reduced. As a result, costs for manufacturing the idler pulleys 41 and 42 can be reduced.

The end hooks 57a and 57b are configured so as to be symmetrically placed against a plane including the center shaft of the support shaft 53. Therefore, the end hooks 57a and 57b can surely be set onto any regions of the body frame 31 even when the pulley unit 50 changes the direction. Thus, the pulley unit 50, which is uniformly configured, can be set onto the body frame 31 and misalignment of setting the pulley unit 50 can be prevented. As a result, the first carriage 35 and the second carriage 36 can smoothly and stably run on the drive wire 33.

According to the embodiment, the idler pulleys 41 and 42 are rotatably supported by the support shaft 53 with the ball member 52. Thereby, costs for manufacturing the pulley unit 50 can be further reduced.

When the idler pulleys 41 and 42 are rotatably supported with fluid, the idler pulleys 41 and 42 can be smoothly rotated. When the idler pulleys 41 and 42 are rotatably supported with magnetic, rotating force of the idler pulleys 41 and 42 can be adjusted by adjusting the magnetic strength. As a result, load of the driving force of the drive wire 33 can be adjusted.

Further, it is configured that the spring hooks 58a and 58b are provided on the engagement substrate 54 and the tensile spring 39 provided on the other end portion of the drive wire 33 is engaged either with the spring hook 58a or the spring hook 58b. Thereby, tensile strength can be applied using the tensile spring 39 to the drive wire 33 extended in a predetermined direction. With the engagement between the tensile spring 39 and the spring hook 58a or 58b, the pulley unit 50 can be used as the engaging unit for the tensile spring 39. Therefore, the tensile spring 39 needs not to be set on the body frame 31. As a result, manufacturing the body frame 31 can be easy.

The spring hooks 58a and 58b are symmetrically placed against a plane including the center shaft of the support shaft 53. Therefore, the tensile spring 39 can be provided at a position optimized for the spring hooks 58a and 58b even when the pulley unit 50 changes the direction.

Further, because the bending portion 56 engaged with the outside of the body frame 31 is provided on the engagement substrate 54, the pulley unit 50 can be mounted on the body frame 31 from the outside of the body frame 31. Therefore, operation efficiency for setting the pulley unit 50 can be further improved.

Because the bolt inserting hole 56a is formed on the bending portion 56 of the engagement substrate 54 and the bolt inserting hole 56a is in the long-hole shape, the engagement substrate 54 can be firmly fixed to the body frame 31. Further, the bolt inserting hole 56a can shift along with the bolt 84. Therefore, relative positions between the engagement substrate 54 and the bolt 84 can be changed. As a result, the position of the pulley unit 50 for the body frame 31 can easily be changed.

The folding portion 81 that bulges outward toward the inside of the body frame 31 from a surface engaged with the bending portion 56 of the engagement substrate 54 is formed on the body frame 31 and the plane area 55 of the engagement substrate 54 is engaged with the folding portion 81. Thus, even when the idler pulleys 41 and 42 rotate based on the driving force applied from the drive wire 33, the plane area 55 does not rotate along with the folding portion 81. Further, the drive wire 33 can be surely and smoothly supported.

The wire engaging portions 59 and 60 including grooves 59a and 60a that puts the drive wire 33 therein and the concave portions 59b and 60b communicating to the grooves 59a and 60a, with wider width than those of the grooves 59a and 60a are formed on the bending portion 56. Further, the fitting member 61 for fitting an end portion of the drive wire 33 to the concave portions 59b and 60b are provided on the bending portion 56. Thus, by inserting the end portion of the drive wire 33 into the groove 59a or 60a and fitting the fitting member 61 to the concave portion 59b or 60b, the drive wire 33 can be engaged with the engagement substrate 54. Therefore, an engaging unit for the drive wire 33 can be omitted from the body frame 31. As a result, the body frame 31 can be easily manufactured.

The wire engaging portions 59 and 60 are symmetrically placed against a plane including the center shaft of the support shaft 53 in a vertical direction. Therefore, the wire engaging portions 59 and 60 can be arranged at a position optimized for any regions of the body frame 31 even when the pulley unit 50 changes the direction.

The grooves 59a and 60a, the concave portions 59b and 60b are arranged on the bending portion 56. The opening portions 83a and 83b are formed on the body frame 31 for communicating to the grooves 59a and 60a, and the concave portions 59b and 60b. Therefore, when engaging the drive wire 33 with the bending portion 56, the drive wire 33 can be inserted to the body frame 31 via the opening portions 83a and 83b. Further, the drive wire 33 can be engaged with the outside of the body frame 31. As a result, the operation efficiency for setting the drive wire 33 can be improved.

The notch portion 81c is formed on the body frame 31 and the center hook 57c is formed on the engagement substrate 54 for engaging the notch portion 81c. By engaging the center hook 57c with the notch portion 81c, the pulley unit 50 can be engaged with the body frame 31. Thereafter, the bending portion 56 can be firmly fixed to the body frame 31 using the bolt 84. As a result, the operation efficiency for mounting the pulley unit 50 can be further improved.

The notch portion 81c is formed in the taper shape. Thus, the center hook 57c can be engaged with the notch portion 81c based on the taper shape. As a result, the engagement substrate 54 can be easily engaged with the body frame 31.

The driving-force transferring unit includes the drive wire 33. Thereby, costs for manufacturing the driving-force transferring unit can be reduced.

The idler pulleys 41 and 42, the support shaft 53, the engagement substrate 54 are made of plastic. Therefore, weight of the pulley unit 50 can be light and costs for manufacturing the pulley unit 50 can be reduced.

The pulley units 50 are provided at the four corners inside of the body frame 31 and the drive wires 33 are extended between a pair of the idler pulleys 41 and 42. Thus, misalignment of the pulley units 50 arranged on the same side of the body frame 31 can be prevented. As a result, the first carriage 35 and the second carriage 36 can smoothly and stably run on the drive wire 33 extended between the pulley units 50 arranged on the same side of the body frame 31.

The pulley units 50 provided on the both sides of the body frame 31 are configured in the same shape. Therefore, misalignment of the pulley units 50 arranged on the both sides of the body frame 31 can be prevented. As a result, the first carriage 35 and the second carriage 36 can smoothly and stably run on the drive wire 33 wound around the pulley units 50 arranged on the same side of the body frame 31.

The pulley unit 50 on the one side of the body frame 31 is half turned against a horizontal line perpendicular to the center shaft of the support shaft 53 and faces to the other pulley unit 50 on the other side of the body frame 31. Thus, misalignment of the facing pulley units 50 provided on the facing sides of the body frame 31 can be prevented. As a result, the first carriage 35 and the second carriage 36 can smoothly and stably run on the drive wire 33 extended between the pulley units 50 provided on the same side of the body frame 31.

According to the embodiment, all the pulley units 50 are configured in the same shape. However, only the pulley units 50 provided on the same side of the body frame 31, which extend the same drive wire 33, can be configured in the same shape.

Figure 17:
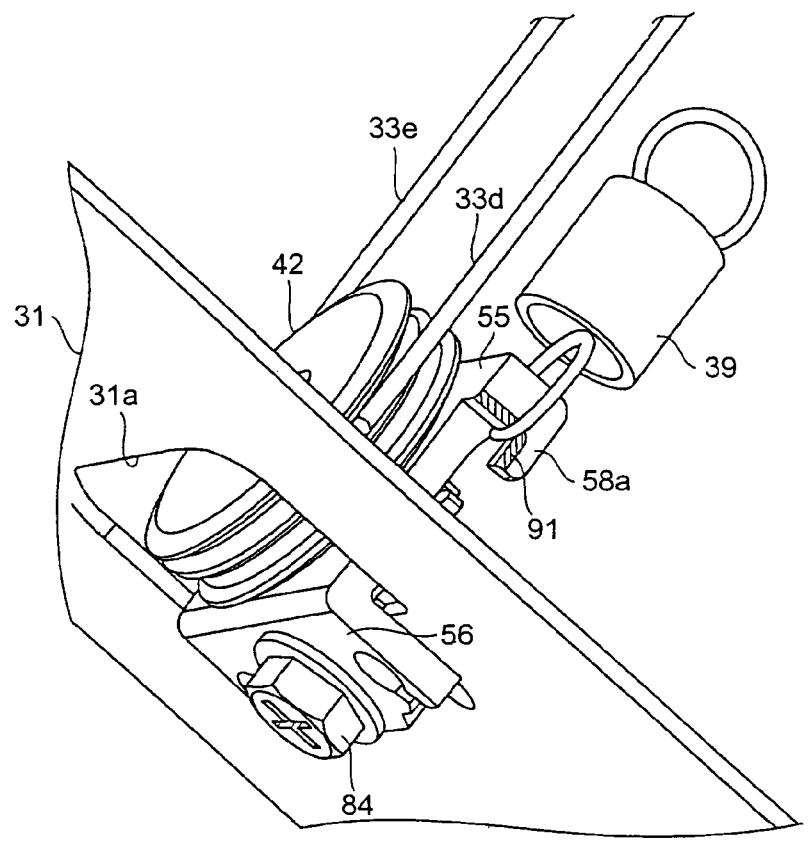
FIG. 17 is a top view of the second arrangement of the pulley unit and the drive unit shown in FIGS. 13 and 15.
Figure 18:
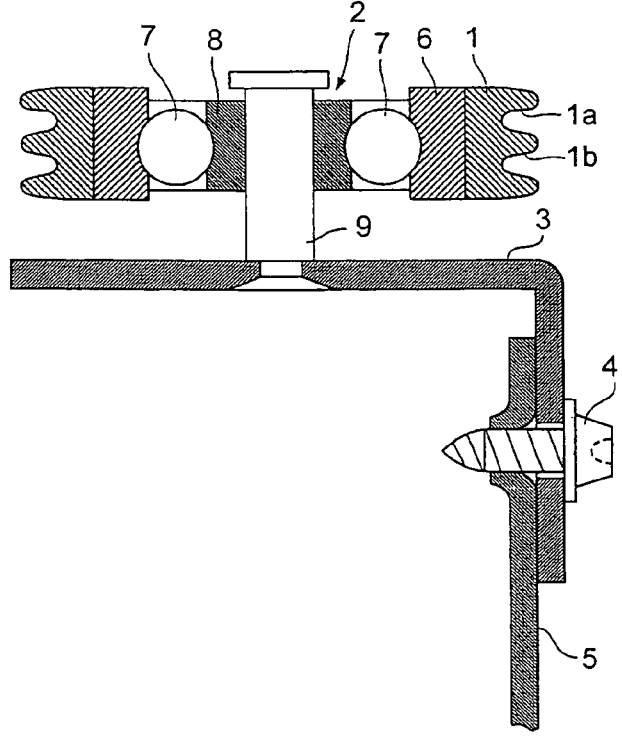
FIG. 18 is a schematic for explaining a conventional idler pulley supported by a ball bearing.

FIG. 17 is a top view of an arrangement of the image reading device and the image forming apparatus including the image reading device according to a second embodiment of the present invention. The same reference numbers denote the same components explained above.

As shown in FIG. 17, a curving portion 91 is formed on the spring hooks 58a and 58b and the curving portion 91 is configured to engage with the tensile spring 39.

According to the second embodiment, it becomes possible to prevent the tensile spring 39 from getting damaged caused by a strain of the drive wire 33 when the tensile spring 39 is engaged either with the spring hook 58a or 58b.

According to the above embodiments, it is configured so that the idler pulleys 41 and 42, and the carriage pulley 40 are inclined. However, the idler pulleys 41 and 42, and the carriage pulley 40 can be arranged without being inclined.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device, comprising:
    a running unit on which a scanning optical system that optically scans a document is mounted, the running unit moving in a case;
    a driving-force transferring unit that is extended in a predetermined direction, of which a predetermined portion is attached to the running unit;
    a driving unit around which the driving-force transferring unit is wound, the driving unit changing a direction of movement of the driving-force transferring unit by rotating in a forward direction or in a backward direction based on a driving force from a driving source; and
    at least one pulley unit that is rotatably attached to the case and supports the driving-force transferring unit, wherein the pulley unit includes:
        an outer ring member that is rotated by the driving-force transferring unit;
        an inner ring member that rotatably supports the outer ring member; and
        an engaging unit that is provided on the inner ring member, to engage with the case,
        wherein the engaging unit is symmetric on both sides with respect to a plane including a center shaft of the inner ring member,
        one end portion of the driving-force transferring unit is attached to the inner ring member via a spring member,
        the inner ring member includes a spring engaging unit to be engaged with the one end portion of the driving-force transferring unit, and
        the spring engaging unit is disposed on a symmetrical position with respect to a surface including a center axis of the inner ring member.

2. The image reading device according to claim 1, wherein the pulley unit is provided at four corners inside of the case, and
the driving-force transferring unit includes two driving-force transferring unit extended between two pulley units provided on same surface of the case.

3. The image reading device according to claim 2, wherein one pulley unit provided on one surface of the case is half turned against a horizontal line perpendicular to the center shaft of the inner ring member and faces other pulley unit provided on other surface of the case.

4. An image forming apparatus, comprising:
    an image forming unit that forms an image on a recording medium; and
    the image reading device according to claim 1.

5. An image reading device, comprising:
    a running unit on which a scanning optical system that optically scans a document is mounted, the running unit moving in a case;
    a driving-force transferring unit that is extended in a predetermined direction, of which a predetermined portion is attached to the running unit;
    a driving unit around which the driving-force transferring unit is wound, the driving unit changing a direction of movement of the driving-force transferring unit by rotating in a forward direction or in a backward direction based on a driving force from a driving source; and
    at least one pulley unit that is rotatably attached to the case and supports the driving-force transferring unit, wherein the pulley unit includes:
        an outer ring member that is rotated by the driving-force transferring unit;
        an inner ring member that rotatably supports the outer ring member; and
        an engaging unit that is provided on the inner ring member, to engage with the case,
        wherein the engaging unit includes a first engagement area engaged with an outside of the case, and
        wherein the case includes a folding portion, and the inner ring member includes a second engagement area engaged with the folding portion.

6. The image reading device according to claim 5, wherein the folding portion bulges from a surface engaged with the first engagement area toward inside of the case.

7. An image forming apparatus including the image reading device according to claim 5.

8. An image reading device, comprising:
    a running unit on which a scanning optical system that optically scans a document is mounted, the running unit moving in a case;
    a driving-force transferring unit that is extended in a predetermined direction, of which a predetermined portion is attached to the running unit;
    a driving unit around which the driving-force transferring unit is wound, the driving unit changing a direction of movement of the driving-force transferring unit by rotating in a forward direction or in a backward direction based on a driving force from a driving source; and
    at least one pulley unit that is rotatably attached to the case and supports the driving-force transferring unit, wherein the pulley unit includes:
        an outer ring member that is rotated by the driving-force transferring unit;
        an inner ring member that rotatably supports the outer ring member; and
        an engaging unit that is provided on the inner ring member, to engage with the case, wherein a notch portion is formed on the case and a hook engaging with the notch portion is provided on the engaging unit.

9. The image reading device according to claim 8, wherein the notch portion is formed in a tapered shape.

10. An image forming apparatus including the image reading device according to claim 8.

11. An image reading device, comprising:
- a running unit on which a scanning optical system that optically scans a document is mounted, the running unit moving in a case;
- a driving-force transferring unit that is extended in a predetermined direction, of which a predetermined portion is attached to the running unit;
- a driving unit around which the driving-force transferring unit is wound, the driving unit changing a direction of movement of the driving-force transferring unit by rotating in a forward direction or in a backward direction based on a driving force from a driving source; and
- at least one pulley unit that is rotatably attached to the case and supports the driving-force transferring unit, wherein the pulley unit includes:
  - an outer ring member that is rotated by the driving-force transferring unit;
  - an inner ring member that rotatably supports the outer ring member; and
  - an engaging unit that is provided on the inner ring member, to engage with the case,
  - wherein the engaging unit is symmetric on both sides with respect to a plane including a center shaft of the inner ring member, and
  - a notch portion is formed on the case and a hook engaging with the notch portion is provided on the engaging unit.

12. An image forming apparatus including the image reading device according to claim 11.

* * * * *